Patented May 7, 1929.

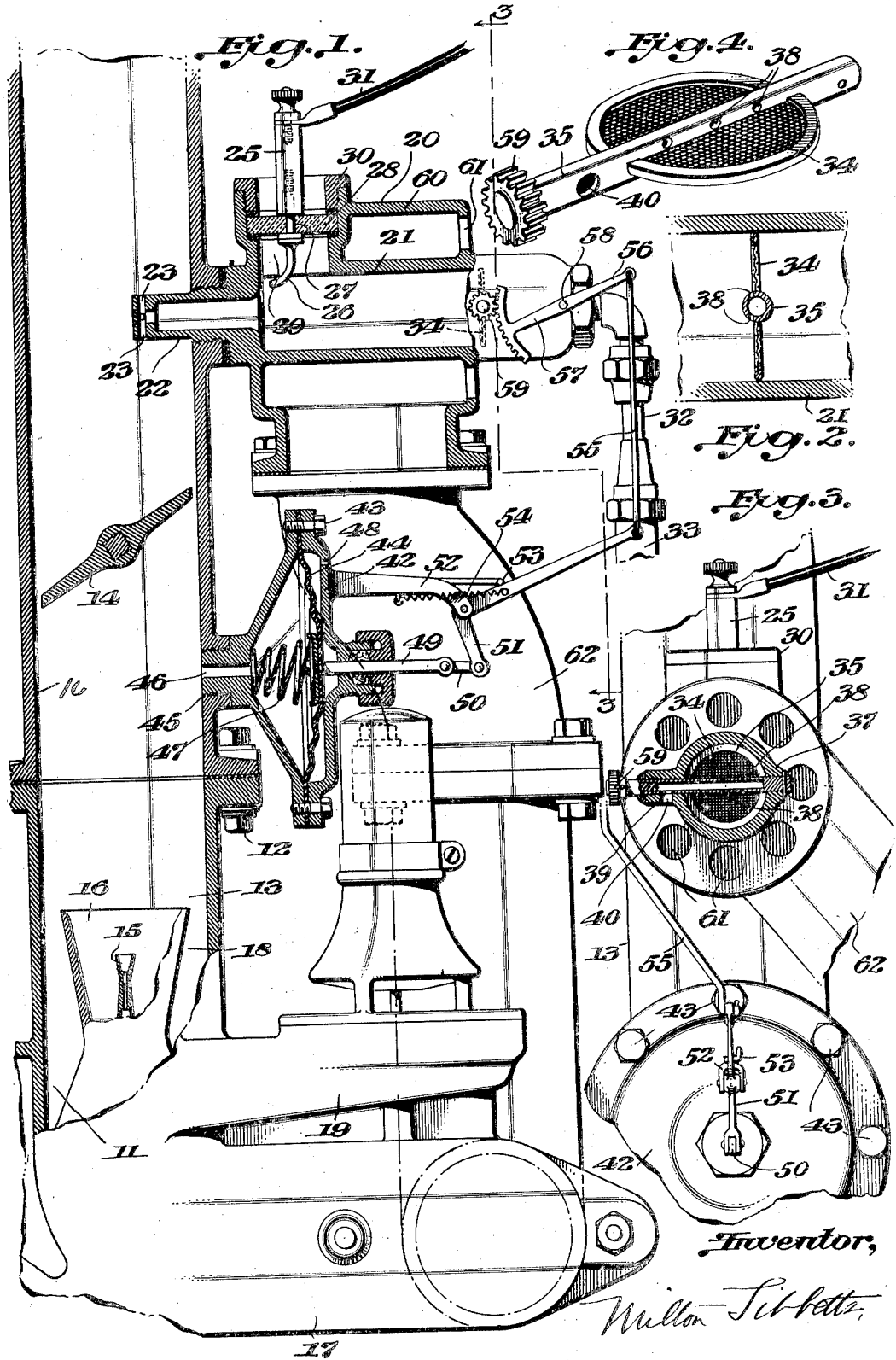

1,712,461

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 23, 1919. Serial No. 332,705.

This invention relates to hydrocarbon motors and particularly to heating devices for the mixture passing from the carburetor to the motor.

In the form of the invention shown the heater device is of the combustion type, in which a chamber is supplied with a combustible mixture which is fired in the chamber and discharged into the intake pipe of the motor to thereby heat the mixture passing from the main carburetor to the motor. Such heaters are particularly desirable at the time of starting the motor and more so in cold weather when it is difficult to volatilize the gasoline usually employed as fuel.

In addition to heating the mixture passing to the motor, it is some times desirable to preheat the air passing to the main carburetor to thereby assist in volatilization of gasoline at the fuel nozzle. This preheating of the air for the main carburetor will also assist in thawing out the carburetor should water collect in any part of the carburetor and freeze.

After a hydrocarbon motor has been started and warmed up, if it is then operated at relatively high speed and under fairly heavy load, it is found that a heater device is not essential because of the fact that the entire motor itself is very largely heated up and of the further fact that the speed of the gases through the intake conduit is so great that the fuel is readily atomized and retained in its finely divided state throughout its travel to the motor cylinders. At these times, therefore, an additional quantity of air may be supplied to the motor intake conduit with the result that even greater efficiency is obtained and the motor is some times found to operate cooler.

One of the objects of the present invention is to provide a heater device through which may be supplied either hot gases or cold air, depending upon the needs of the motor.

Another object of the invention is to provide a heater device having a mixture inlet and an air inlet and a valve for controlling the device.

Another object of the invention is to provide a combustion heater with means dependent upon the pressure in the motor intake pipe below the throttle valve for controlling the heater.

Another object of the invention is to provide a heater in which there is a pivoted screen having self-cleaning properties.

Another object of the device is to provide a heater in which the spark plug is formed as a part of the heater.

Another object of the invention is to provide a combustion heater having an outlet to the motor intake pipe above the throttle valve, with a diaphragm controller connected to the intake pipe below the throttle valve and having connections for governing the operation of the heater.

Another object of the invention is to provide a combustion heater having an inlet air jacket communicating with the main air intake of the motor carburetor.

Other objects of the invention will appear from the following description taken in connection with the drawings which form a part of this specification and in which Figure 1 is a vertical section and part elevation of a motor intake pipe and adjacent elements embodying the invention;

Figure 2 is an enlarged fragmentary section of a portion of the combustion chamber;

Figure 3 is a transverse section on the line 3—3 of Figure 1 with the screen and its pivotal support, however, in reversed position; and Figure 4 is an enlarged perspective view of the screen and its support.

Referring to the drawings, 10 represents the intake conduit or pipe of a hydrocarbon motor and 11 is a carburetor connected to said pipe 10 as by the bolts 12. The upper part 13 of said carburetor 11 forms a continuation of the intake conduit 10.

Arranged in the conduit 10 is a butterfly throttle valve 14 which may be manually or otherwise controlled and which is adapted to regulate the supply of combustible mixture passing from the carburetor 11 to the motor through the conduit 10.

The float chamber of the carburetor 11 is omitted from the drawings, but it will be understood that it supplies liquid fuel to the nozzle 15 which is surrounded by a mixture tube 16 supplied with air from a main air intake 17. The air space 18 around the tube 16 is supplied with an additional quantity of air through an auxiliary valved intake 19. This carburetor is of the well known Packard type and needs no description of operation. It is adapted to supply mixture to the motor through the conduit 10.

A combustion heater for use in this invention is generally indicated at 20. It comprises a body forming a combustion chamber 21 and an extension 22 provides for threaded engagement with the intake pipe 10 to secure the heater to the intake pipe. The part 22 extends somewhat into the intake pipe 10 and has one or more outlet passages 23 communicating therewith. Thus the products of combustion or heated gases from the chamber 21 are discharged into the intake pipe 10.

Formed as a part of the heater is a spark plug having a two-part electrode 25, 26, the part 26 having a shank 27 which extends through an opening in an insulated block 28 and is threaded into the part 25. The insulated block 28 is secured over an opening 29 formed in the body of the chamber 21, as by a threaded ring 30. The part 26 of the electrode is shown as curved so that its inner end extends in proximity to the body of the heater, thus providing a gap between it and the casting across which a spark may jump to ignite the charge in the combustion chamber 21. An insulated wire 31 leads to the part 25 of the electrode for supplying the necessary sparking current. The insulated block 28 may be of glass so that the fire in the combustion chamber 21 may be observed through it.

The combustion chamber 21 is fed with a suitable combustible mixture by a pipe 32 leading from an auxiliary carburetor 33 which may be of any suitable type and connected with the gasoline line or float chamber which supplies the main carburetor 11. Thus the mixture from the auxiliary carburetor 33 will be drawn through the pipe 32 into the combustion chamber 21 by the suction of the motor in the intake pipe 10, and this mixture will be fired by the spark plug above described and the hot burnt gases will be drawn into the intake pipe 10 there to mix with the mixture from the carburetor 11 and heat said mixture.

Near the inlet to the combustion chamber 21 is arranged a screen 34 which is secured to a pivotally mounted tube 35, arranged in trunnions 36 and 37 of the body of the heater 20. This tube 35 has a series of lateral openings 38 which are shown as arranged on one side of the screen 34 and there is an inlet port 39 which is adapted to register with a port 40 formed in the trunnion 36 when the tube 35 is in the position shown in Figure 3. In the position of the tube 35 shown in Figures 1 and 2, the ports 39 and 40 are out of register and the interior of the tube, therefore, is not in communication with the atmosphere as it is in the position shown in Figure 3.

This tube 35, and consequently the screen 34 which is attached to it, is adapted to be rotated about its axis to change the relative positions of the ports 39 and 40 and to shift the position of the screen 34. When it is in the position shown in Figures 1 and 2, the screen 34 acts to break up the mixture which enters the chamber 21 so that it will be in better condition for igniting when it reaches the spark plug. If it is desirable to clean the the screen, the tube 35 may be turned on its axis 180° which will throw the port 39 to register with the port 40 and the suction in the chamber 21 will then draw air through the ports 40 and 39 and into the chamber 21 through the ports 38. These ports will then be on the opposite side of the screen from that shown in Figure 2 and all of the air passing from them will pass through the screen 34 in the opposite direction to that in which the mixture had previously been passing and thus any particles of dirt on the screen will be blown off of it and drawn into the intake pipe 10 and pass through the motor. This opening of the combustion chamber 21 to the atmosphere through the port 40 will also materially, if not entirely, cut off the supply of mixture from the pipe 32 and the cold air entering at the port 40 will be supplied to the intake pipe 10 instead of hot burnt gases, the cold air predominating in the chamber 21 to such an extent that the mixture will not ignite.

This shifting of the tube or valve 35 may be accomplished automatically, as by the diaphragm means illustrated in the drawing. This diaphragm is dependent upon the pressure or depression in the intake pipe 10 below the throttle valve 14 and it governs or controls the heater accordingly.

A diaphragm casing is formed by two pieces 41 and 42 bolted together as at 43 with a diaphragm 44 between them. This casing is threaded into the intake pipe 10 below the throttle 14 as at 45 and a port 46 forms a communication between the interior of the casing and said intake conduit 10.

A spring 47 normally retains the diaphragm 44 in its outward position as shown in Figure 1, and a vent 48 permits the diaphragm 44 to operate freely.

Secured to the diaphragm is a rod 49 which is connected by a link 50 to a bell crank lever 51 supported by a bracket 52, and a stop 53 limits the movement of the bell crank lever 51 in one direction. Also, a spring 54 assists in carrying the bell crank lever from one to the other of its extreme positions.

The other arm of the bell crank lever 51 is connected through a link 55 with an arm 56 on a segment 57, which segment is pivoted at 58. The segment 57 meshes with a pinion 59 on the projecting end of the valve or tube 35 above referred to so that the oscillation of the segment 57 rotates said tube. Thus it will be seen that the movement of the diaphragm 44 towards the left in Figure 1 will, through the connections described, operate the segment 57 so that it will turn the valve or tube 35 through 180° so that the screen 34, in one position of the tube 35, will be in position to break up the mixture as it enters the chamber 21, or the screen may be reversed when the tube is in its other position and cold air will be sucked into the chamber 21 through the port 40 and through the screen 34 in the reverse direction.

In starting the motor, the throttle valve 14 is set in nearly closed position, such as shown in the drawing, and while there is considerable depression in the intake pipe 10 above the throttle valve, there is very little suction in the pipe below the throttle valve so there is considerable suction through the combustion chamber 21 and a good mixture is brought into the chamber and fired. Also, under these circumstances the diaphragm 44 is in the position shown in Figure 1 and the air port 40 is, therefore, closed.

Later, if the throttle 14 is opened fairly wide and the motor is speeded up, there will be greater depression in the intake pipe 10 below the throttle valve 14, which depression will act to draw the diaphragm 44 towards the left in Figure 1 and this will cause the valve 35 to be turned on its axis and the ports 39 and 40 to be brought into register so that the chamber 21 is open to the atmosphere and cold air is drawn through the chamber and supplied as additional air to the mixture in the conduit 10. The reverse operation takes place after the throttle is again closed.

In addition to heating the mixture as it passes through the intake conduit 10, the present invention contemplates heating the air passing into the main air intake 17 of the carburetor 11. Thus the combustion chamber 21, which is arranged entirely outside of the intake pipe 10, is provided with an air jacket 60 which has inlet openings 61 as shown particularly in Figures 1 and 3. Communicating with the jacket 60 and the intake 17 of the carburetor 11 is a pipe or conduit 62 whereby air drawn into the carburetor 11 will pass in at the port 61 and around the outside of the chamber 21 where it is heated and then downwardly through the conduit 62 to the intake 17. This warm air will assist materially in vaporizing the gasoline in the nozzle 15.

Other forms of devices than that shown may be made without departing from the spirit or scope of the invention.

Having thus described my invention, what I claim and desire to secure by Letters Patent is:

1. In a hydrocarbon motor, the combination with the motor intake conduit, of a combustion heater having its outlet connected with said conduit, means for supplying mixture to said heater, and means for opening the heater to the atmosphere to a sufficient extent to make the heater inoperative and thereby supply additional air to the intake conduit.

2. In a hydrocarbon motor, the combination with the motor intake conduit, of a combustion heater having its outlet connected with said conduit, means for supplying a mixture to said heater, a screen in the mixture supply line, and means for opening said supply line to the atmosphere upon changing the position of said screen.

3. A heater unit comprising a chamber having an inlet, a pivoted screen adjacent said inlet, and air inlet means controlled by the position of said screen.

4. A heater device comprising a chamber, a screen in said chamber, a hollow pivoted mounting for said screen, said mounting controlling an air inlet port for said chamber.

5. In a hydrocarbon motor, the combination with the intake conduit and the throttle valve therein, of a heater device discharging into said conduit beyond the throttle valve, and means dependent upon the depression in said conduit below said throttle valve for controlling the operation of said device.

6. In a hydrocarbon motor, the combination with the motor intake conduit and the throttle valve therein, of a combustion heater device having its outlet connected to said conduit beyond said throttle, and means dependent upon the difference between atmospheric pressure and the pressure in said conduit below said throttle for controlling the operation of said device.

7. In a hydrocarbon motor, the combination with the motor intake conduit and the throttle valve therein, of a combustion heater device having its outlet connected to said conduit above said throttle, and means actuated by a predetermined drop in pressure in said conduit below the throttle relative to atmospheric pressure for controlling the operation of said device.

8. In a hydrocarbon motor, the combination with the motor intake conduit and the throttle valve therein, of a combustion heater device having its outlet connected to said conduit above said throttle, and means actuated by a predetermined drop in pressure in said conduit below the throttle relative to atmospheric pressure for cutting out the heating action of said device.

9. In a hydrocarbon motor, the combination with the motor intake pipe and the throttle valve therein, of a combustion heater having its outlet connected to the conduit above the throttle valve, a diaphragm having one side acted upon by the depression in the intake conduit below said throttle valve, and connections from said diaphragm to said heater.

In testimony whereof I affix my signature.

MILTON TIBBETTS.